United States Patent Office 2,767,634
Patented Oct. 23, 1956

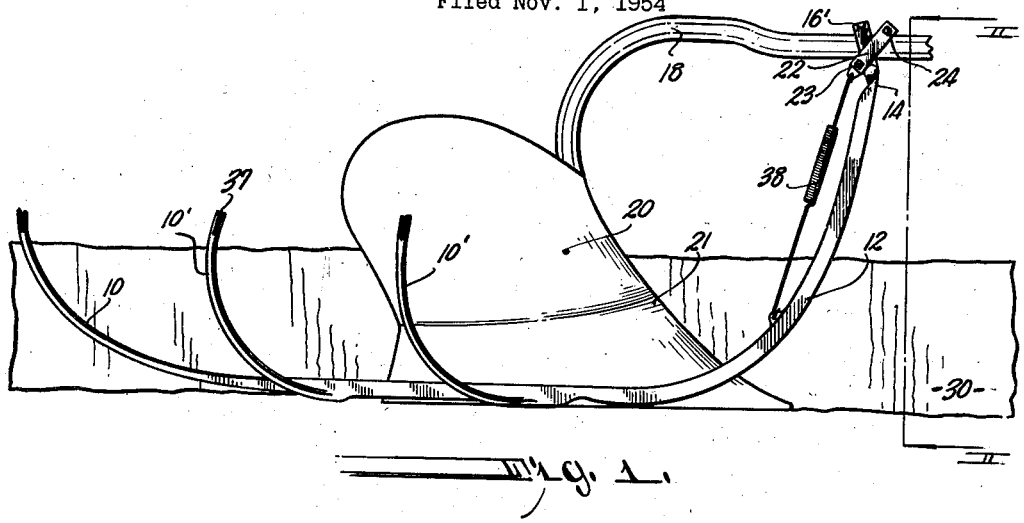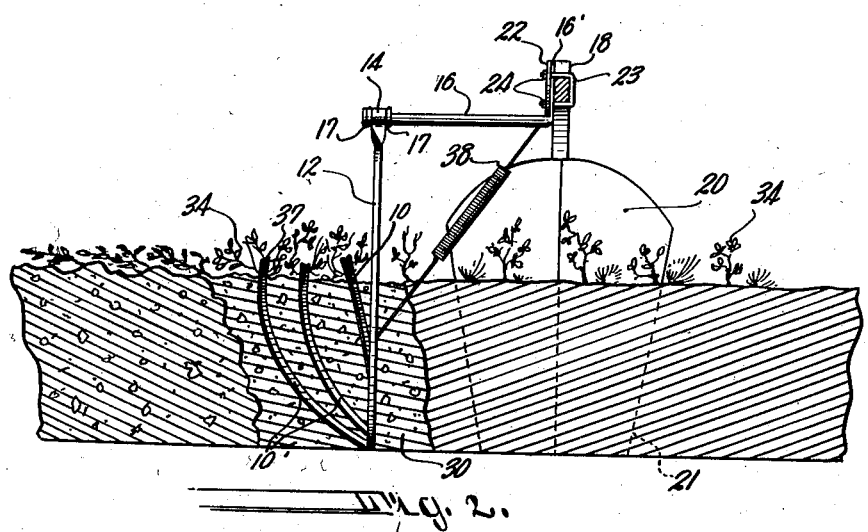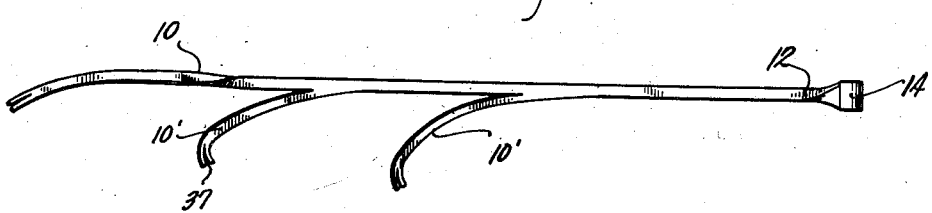

2,767,634

WEED CONTROLLER AND MULCHING APPLIANCE

Charles Warner Brandborg, Seattle, Wash.

Application November 1, 1954, Serial No. 465,999

1 Claim. (Cl. 97—129)

The present invention relates to a weed controller and mulching appliance designed for attachment to plowing equipment for operation simultaneously with the usual operating movement of the plow in farm work.

Accordingly the primary object of the invention is to provide an improved form of accessory device designed for attachment to plows in position for being drawn through the material of the furrow slices being upturned by the plow and thereby engaging and removing the weed growth from the furrow soil and leaving such weed products deposited upon the surface of each new path or slice of the furrow material.

For accomplishing such purpose of the invention I have designed an extremely simple but very efficient form of appliance comprising a multiple tine structure adapted to be attached to and trailed by the plow in proper working position for encountering the newly plowed furrow and traversing the same simultaneously with the continued plowing action or movement of the plow, for accomplishing the desired weed removing and mulching operation.

With the foregoing general objects in view, the invention will now be described by reference to the accompanying drawing, illustrating one preferred form of construction of said appliance for achieving the desired function and purpose of my invention, after which those features and combinations thereof deemed to be novel and patentable will be particularly set forth and claimed.

In the drawing—

Figure 1 is a side elevation illustrating a plow having one form of my improved weeder appliance attached thereto and in operative relation to a plowed ground furrow;

Figure 2 is a front elevational view of the same—said view repesenting a cross-section taken on the section-line II—II of Figure 1; and Figure 3 is a separate plan view of the tine structure or assembly which constitutes the essential working or weeding portion of my improved appliance.

As indicated in the foregoing, the present invention or improvement is aimed at providing a more economical as well as effective and labor-saving control as regards the farmer's weed and erosion difficulties with reference to crop production. The prevailing practice has long been the plowing underground of weed growth, stubble and other obnoxious plant growth and thereby smothering the same, in their underground state, or else bringing the same again to the surface by harrowing or other operation, for exposure to sun or other treatment designed to effectively dispose of such obnoxious material. While such methods are of course effective to the extent that they are consistently followed and persisted in, they are not as economical and expeditious as would seem to be desirable; and accordingly the present invention is aimed at accomplishing the same general objects by a more direct and effective procedure.

Referring now to the accompanying drawing in detail, the improved weed control device is illustrated in the form of a tine assembly, comprising the main tine 10 and a series of coordinate tines 10' represented as branching off at intervals from the forward portion of the main tine 10, the forward end of which has an upwardly extending arm portion 12 terminating in an eye or loop 14 as shown in Figures 2 and 3. The said eye or loop 14 is for the purpose of mounting the forward end of the tine assembly in pivotally supported relation to one end of a rod 16 between collars 17, which rod is designed to be secured in transversely extending relation to the beam 18 of a conventional type of plow, having the usual moldboard 20 and plowshare portion 21, as illustrated in Figures 1 and 2. The attachment of the supporting rod 16 to the plowbeam may readily be made by means of a clamp-plate 22, U-bolt 23 and nuts 24, for engaging and securing the flat-end portion 16' of said rod, which is of such length as to support the tine assembly in its operative position, or in offset relation to the moldboard 20 of the plow and in a path corresponding to the preceding furrow opened up by the plowing operation—as indicated at 30. This is of course the path or line of operation required for causing the tine assembly to intercept the material as it is displaced from the new furrow being produced by the plow's operation—as indicated in Figures 1 and 2—whereby the tines are enabled to engage and extract the weed growth from said newly plowed and upturned material and to deposit such weed growth upon the upper surface, as indicated at 34.

The tine structure is of a type adapted to be cut and formed from sheet steel, and having the respective tines 10 and 10' of appropriate length and relative proportions, the tines 10' being cut from the main or longitudinal portion of the main tine 10 and projecting laterally therefrom, and all of the tines curving upwardly and being somewhat twisted for facilitating a certain degree of cutting action through the furrow material as the tines are pulled forwardly by the travel of the plow. Moreover, the design of the tine assembly is such that the tines 10' project slightly different distances from the main tine so as to be trailed along correspondingly different paths through the furrow material, and all of the tines project upwardly sufficiently to bring their outer free ends above the surface of said material.

Again, it is proposed to form slits 37 in said outer free ends of the tines, and spread the individual slits slightly, thereby increasing the effectiveness of their operation as regards their weed engaging and gathering function.

It is desirable, when the weeder device is not actually travelling through a furrow slice and hence is not loaded with soil material, that the tine assembly be raised sufficiently above the ground, to avoid any damage from striking rocks or travelling over rough ground; and accordingly a lifting spring 38 is provided, between the forward end of the main tine arm and the clamping means for holding the supporting rod 16, such spring being of sufficient strength for serving to maintain the tine assembly in an elevated position at such times.

By the operation of a weeder appliance of the above described construction, it will at once be apparent that, simultaneously with the plowing operation which has broken up and loosened and mellowed the soil that is being plowed, the weed growth is likewise loosened so as to be readily removable from the soil, and consequently may be freely dragged by the tines, which—by virtue of their curved shape or contour, propel the weeds gradually to the upper surface of the soil, where the exposure to the sun and air soon cause them to dry up and die, and thereafter serve as a soil mulching factor as well as for protection against undue soil erosion. Moreover, an important feature of economy characterizes the improved appliance, in that the power required for its operation is reduced to a minimum as compared with prior types of operation, since in the case of the instant device the travel of the tines, being through the soil when it is broken up and mellow, meets with very much less resistance than in the case of other procedures operating from the top surface and through unbroken soil conditions. There is also the further contrast, as compared with ordinary harrow operation carried out by downward action through unbroken soil, in that the instant device comprises curved tines working not only in broken soil but with the free ends of the tines curving gradually to the surface, and the entire tine assembly being lifted bodily and automatically into inoperative position on disengagement of the tines from the soil material.

Thus, not only is the control of the weed growth carried out in an effective and expeditious manner with great saving of both time and labor, but the benefits as regards mulching and overcoming of soil erosion troubles are likewise secured by means of the operation of the improved weeding appliance, as will be readily apparent and understood from the above described operation of the device.

It will therefore be apparent that I have devised a practical and efficient appliance having a construction adapted to fulfill all the requirements and objects of my invention as herein set forth; and while the same is illustrated in its relation to a plow of ordinary conventional design, it is obvious that it may be as well adapted for other types of plow assemblies, such as gang and disk plows; I therefore desire to be understood as reserving the right to all such applications of my invention as may fairly fall with the spirit and scope of the appended claim.

What I claim and desire to secure by Letters Patent is:

A weed controller and mulching appliance comprising an assembly of tines, including an elongated main tine and a plurality of transversely extending tines connected with said main tine at different points longitudinally thereof and having upwardly projecting free end portions, said main tine adapted for travel along the bottom of a plowed furrow and being provided with an upwardly projecting arm for attachment to a plow beam and thereby trailing the tine assembly in said furrow alongside the plow.

References Cited in the file of this patent
UNITED STATES PATENTS

| | | |
|---|---|---|
| 272,845 | Ansley | Feb. 27, 1883 |
| 488,880 | Ebersohl | Dec. 27, 1892 |
| 562,248 | Scott | June 16, 1896 |
| 978,259 | Aden | Dec. 13, 1910 |
| 1,285,522 | Wilkinson et al | Nov. 19, 1918 |
| 1,573,592 | Wicker et al. | Feb. 16, 1926 |
| 1,787,877 | Smythe | Jan. 6, 1931 |
| 1,941,306 | Hotto | Dec. 26, 1933 |